(12) United States Patent
Swierc et al.

(10) Patent No.: US 9,588,876 B2
(45) Date of Patent: Mar. 7, 2017

(54) ESTIMATING LIKELIHOOD OF CODE CHANGES INTRODUCING DEFECTS

(71) Applicant: Microsoft Corporation, Redmond, WA (US)

(72) Inventors: Stanislaw Swierc, Gliwice (PL); Martin O'Flaherty, Redmond, WA (US); Mireya Rodríguez Santiago, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 14/450,164

(22) Filed: Aug. 1, 2014

(65) Prior Publication Data
US 2016/0034270 A1 Feb. 4, 2016

(51) Int. Cl.
*G06F 9/44* (2006.01)
*G06F 11/36* (2006.01)
*G06N 7/00* (2006.01)

(52) U.S. Cl.
CPC ............ *G06F 11/3668* (2013.01); *G06F 8/71* (2013.01); *G06N 7/005* (2013.01)

(58) Field of Classification Search
CPC . G06F 8/70–8/71; G06F 8/77; G06F 11/3668; G06F 11/3616
USPC .......................................................... 717/126
See application file for complete search history.

(56) References Cited

U.S. PATENT DOCUMENTS

| 8,677,315 | B1 | 3/2014 | Anderson et al. | |
|---|---|---|---|---|
| 8,739,125 | B2 | 5/2014 | Luka et al. | |
| 8,856,725 | B1 * | 10/2014 | Anderson | G06F 8/75 717/103 |
| 2005/0096950 | A1 * | 5/2005 | Caplan | G06Q 10/06314 705/7.24 |
| 2005/0114829 | A1 * | 5/2005 | Robin | G06Q 10/06 717/101 |
| 2008/0271006 | A1 * | 10/2008 | Nagappan | G06F 11/3616 717/162 |
| 2009/0070734 | A1 * | 3/2009 | Dixon | G06F 8/71 717/102 |
| 2010/0050156 | A1 * | 2/2010 | Bonanno | G06F 8/443 717/122 |
| 2010/0146489 | A1 | 6/2010 | Ortiz | |
| 2010/0293407 | A1 | 11/2010 | Locasto et al. | |

(Continued)

OTHER PUBLICATIONS

Pavlo, et al., "The NMI Build & Test Laboratory: Continuous Integration Framework for Distributed Computing Software", In the Proceedings of LISA '06: 20th Large Installation System Administration Conference, Dec. 3, 2006, 13 pages.

(Continued)

*Primary Examiner* — Duy Khuong Nguyen
(74) *Attorney, Agent, or Firm* — Tom Wong; Micky Minhas

(57) ABSTRACT

Information about a failed build of a computer software project under development can be accessed, where the information describes symptoms of the failed build. Committed change collections can be identified as collections that were committed since a previous successful build of the computer software project. Also, respective scores for the committed change collections can be produced. Each score can represent an estimate of a likelihood that an associated one of the committed change collections is at least a partial cause of the build failure.

19 Claims, 8 Drawing Sheets

(56) References Cited

U.S. PATENT DOCUMENTS

| | | | |
|---|---|---|---|
| 2011/0035726 A1* | 2/2011 | Davies | G06F 8/71 |
| | | | 717/110 |
| 2011/0252394 A1* | 10/2011 | Sharma | G06F 11/3616 |
| | | | 717/101 |
| 2012/0180027 A1 | 7/2012 | Yu et al. | |
| 2013/0036402 A1* | 2/2013 | Mutisya | G06F 11/3688 |
| | | | 717/124 |
| 2013/0047140 A1 | 2/2013 | Shann et al. | |
| 2013/0152047 A1 | 6/2013 | Moorthi et al. | |
| 2015/0033202 A1* | 1/2015 | Wilson | G06F 8/43 |
| | | | 717/106 |

OTHER PUBLICATIONS

Kim, et al., "Test Automation Framework for Implementing Continuous Integration", In Sixth International Conference on Information Technology: New Generations, Apr. 27, 2009, pp. 784-789.

Van Der Storm, Tijs, "Backtracking Incremental Continuous Integration", In CSMR '08 Proceedings of the 2008 12th European Conference on Software Maintenance and Reengineering, Apr. 1-4, 2008, 10 Pages.

Locke, John, "Microsoft Bayesian Networks: Basics of Knowledge Engineering", Dec. 2009, pp. 1-66.

"Who Broke the Build", Transcription and Slides from Web Video accessed at <<http://youtu.be/SZLuBYlq3OM>>, slides at <<http://goo.gl/q9dGd>>, Video Published on Apr. 29, 2013, 16 Pages.

* cited by examiner

ESTIMATING LIKELIHOOD OF CODE CHANGES INTRODUCING DEFECTS

BACKGROUND

When developing computer software, a collection of one or more changes can be committed to be included in a subsequent build of the software project under development (i.e., the collection is checked into a system or system component where it is to be integrated into the software project under development). Such a collection can be committed together as a batch of changes. Also, a collection can be committed in an atomic commit operation, wherein the system will commit all the changes in the collection at the same time, or will commit none of the changes in the collection. In some scenarios, multiple collections of changes may be committed after a successful build of the software and before a subsequent new build of the software. The changes can be integrated into the new build of the software, and the new build can be tested. If the new build of the software fails (such as failing during compilation, failing one or more tests, and/or failing during some other phase of the build), one or more developers may be notified of the failure. One of the developers may diagnose the build failure and notify a developer who is an author of a change collection that introduced a defect that contributed to the failure. That author developer may then be given an opportunity to fix the defective code change collection (source code, script, etc.), and commit the fixed change collection. Another new build of the software can then be attempted with the fixed change collection. If this other new build succeeds, the developers on the software project can be notified that the build succeeded. In this scenario, developers may be blocked from committing changes for the software project from the time that the build fails until the other new build succeeds.

SUMMARY

In one aspect, the tools and techniques discussed herein can include accessing information about a failed build of a computer software project under development, with the information describing symptoms of the failed build (symptoms identified as likely to indicate defect(s) that contributed to the failure of the build). Committed change collections can be identified as collections that were committed (i.e., committed for inclusion in the build) since a previous successful build of the computer software project. Also, respective scores for the committed change collections can be produced. Each score can represent an estimate of a likelihood that an associated one of the committed change collections is at least a partial cause of the build failure.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
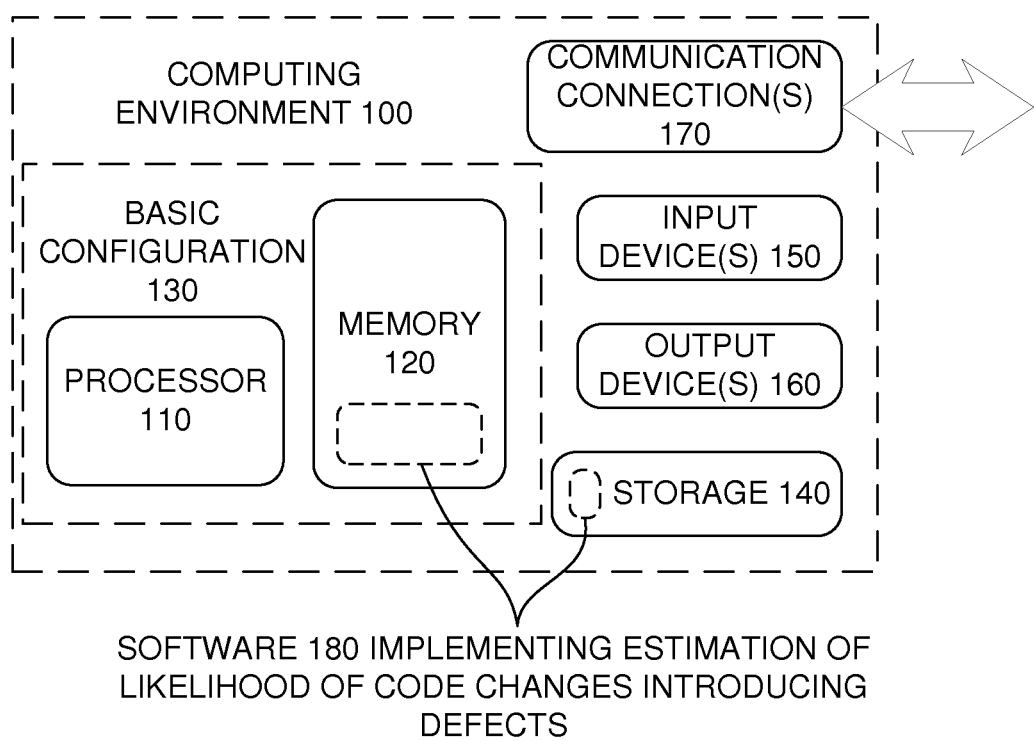
FIG. 1 is a block diagram of a suitable computing environment in which one or more of the described aspects may be implemented.

Aspects described herein are directed to techniques and tools for improvements in dealing with failed builds of computer software projects under development. Such improvements may result from the use of various techniques and tools separately or in combination.

Continuous integration systems dictate that changes be integrated into a build of the software project under development frequently, with the changes being "committed" to be included, and subsequently being integrated into a resulting build of the software project. The software project may be compiled, translated, etc. to form the build that is ready to be tested or verified. The frequency that committed changes are to be integrated may vary according to the rules of a development team for particular software under development. In some continuous integration systems, batches of multiple change collections are integrated into the software project, the software project is processed to form the build, and the build is tested or verified. If the verification succeeds, then all the change collections for that build can be considered valid. If the verification fails, however, then a procedure for dealing with failed builds can be followed, such as the procedures of diagnosis and subsequent fixing described above in the Background section.

In such prior techniques for dealing with failed builds of computer software, developers can spend time diagnosing defects and changes that contributed to build failures. Such diagnoses may be difficult and time-consuming. Moreover, other developers can be blocked from committing changes while one or more developers work to diagnose the build failures. Accordingly, the process for dealing with failed builds can delay computer software development. This is particularly true where multiple newly-committed collections of changes are included in a single build and/or where builds are frequently integrated into the software, such as in large scale continuous integration systems.

The techniques and tools discussed herein may in some aspects keep the source code valid (buildable) by automatic diagnosis and possibly automatic roll back of breaking changes, such as in continuous integration systems. Moreover, the techniques and tools may include adapting models and techniques such as Bayesian networks and/or Bayesian troubleshooters to diagnose build breaks, such as in continuous integration systems. The tools and techniques may include utilizing computer systems and techniques to perform diagnosis of build failures, identifying potential breaking change collections, and possibly also restoring a working state of the software by rolling back the breaking changes.

As an example, when an integration build fails, its logs can be parsed to extract information about a build graph for the build and information about errors (e.g., error codes, etc.). The build graph can be topologically traversed to identify a set of earliest failed build components. For example, if a first build component fails, and several downstream components that depend on that first component also fail, the first (upstream) component can be considered an earliest failed build component. However, there may be multiple such components if failures occurred across multiple different components. By using this set of earliest failed build sections for diagnosis, at least some downstream errors may be filtered out, which can limit the amount of information to be analyzed in diagnosis. Also, information from a version control system can be analyzed and correlated with identified errors. Using such information from the version control system, identified errors can be correlated with changes made by committed change collections that were committed since a previous successful build. In performing diagnosis of build failures, the number of possible relations between source code and build artifacts can be enormous. A probabilistic approach as discussed below can be utilized to handle diagnosis, even where such large numbers of possible relations exist.

The diagnosis technique discussed herein can use a probabilistic approach, such as by using a Bayesian troubleshooter configured to answer probabilistic queries regarding the estimated conditional (posterior) probability that a commit (committed change collection) is a cause of a failure, given observed symptoms. The committed change collection with the highest probability can be rolled back from a repository for the software project under development. This technique can be repeated until a build is successfully verified so that the project is in a consistent state again. Alternatively, other classification techniques could be used to estimate the likelihood that different change collections introduced defect(s) that contributed to the build failure, and some such techniques may produces scores, as discussed herein, whether or not those scores explicitly represent probability estimates. For example, these techniques could include regression, logistic regression, decision trees, decision forests, support vector machines, artificial neural networks, etc. In particular, logistic regression could be done because it explicitly models probabilities that the newly-committed change collections introduced defect(s) that contributed to the build failure. Likewise, an artificial neural network analysis could be performed to return values akin to a rank value and a confidence value for each of the newly-committed change collections. As another example, discriminant functions may not model probability, but such functions can preserve some of properties of probability, and may be used.

The tools and techniques discussed herein may be able to preserve or increase the high frequency of full integration builds, and in some instances may make a software development computer system more efficient and useable by reducing the amount of time and effort developer(s) spend in dealing with build failures and/or waiting for others to handle build failures. Indeed, as will be discussed below in some scenarios, the system may respond to build failures in a fully or partially automated manner to increase usability and efficiency.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described aspects may be implemented. For example, one or more such computing environments can be used as a developer client device, a version control server, an integration server, and/or a diagnosis agent. Generally, various different general purpose or special purpose computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing estimation of the likelihood of code changes introducing defects. An implementation of estimation of the likelihood of code changes introducing defects may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
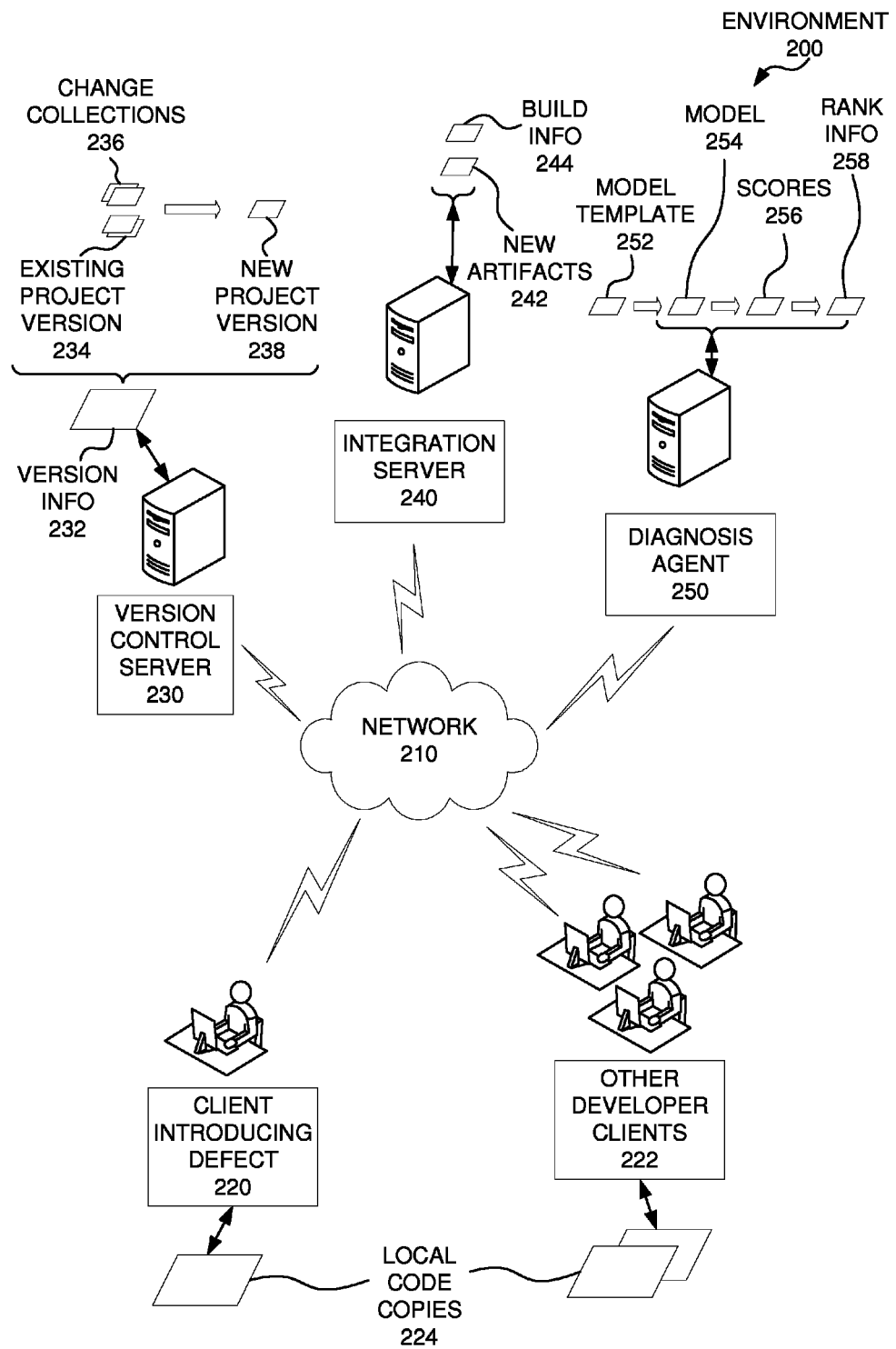
FIG. 2 is a schematic sequence diagram of a computing environment for estimating likelihood of code changes introducing defects.

II. System and Environment for Estimating Likelihood of Code Changes Introducing Defects FIG. 2 is a schematic sequence diagram of an environment (200) in conjunction with which one or more of the described aspects may be implemented. The environment (200) can include a network (210) to which a developer computing client (220) (a developer client that introduced a defect in an example) and other developer clients (222) can be connected. Each of the clients (220 and 222) can interact with a developer (user). Each of the clients (220 and 222) can store and revise one or more local code copies (224), which the clients (220 and 222) can retrieve over the network (210) from a version control server (230). Additionally, after a client (220 or 222) has made one or more changes to its local copy (224), the client (220 or 222) can upload such changes to the version control server (230) over the network (210).

The version control server (230) can maintain version information (232), which can include multiple versions of a project being developed by the development clients (220 and 222). For example, the version information may include an existing software project version (234), which can be source code, scripts, etc. that can be built into computer software. The version information (232) can also store committed change collections (236), each of which can be a collection of one or more changes that has been committed (checked into the version control server (230) to be included in the software project) as a batch by one or more of the developer clients (220 or 222). The version information (232) may associate each such collection (236) with a single developer profile, or a group of developer profiles. The version information (232) may also include a new project version (238) that results from applying the change collections (236) to the existing project version (234). The version information (232) may include many such versions as well as additional information related to the versions and/or change collections (236). The versions (234 and 238) may be stored in various ways. For example, each version (234 and 238) may be stored in the form of the complete project code for that version (234 and 238). As another example, some versions (234 and/or 238) may be stored in the form of descriptions of what changes have been made since a previous version (234 or 238).

The version control server (230) can provide an integration server (240) with access to the new project version (238), and can instruct the integration server (240) to generate new artifacts (242) from the new project version (238). Alternatively, the integration server (240) can retrieve the new project version (238) without an instruction to do so by the version control server (230). For example, the integration server (240) may retrieve a most recent new project version (238) on a periodic schedule, or when the integration server (240) detects changes to the project. In either case, the integration server (240) can generate the new artifacts (242) using build techniques such as compiling source code, translating scripts, etc. to convert the new project version (238) into a form that is suitable for execution and testing. The integration server (240) may invoke one or more computing components such as compiler(s) and/or script translator(s) in generating the new artifacts (242). The integration server (240) can run verification tests on the new artifacts (242), and can maintain build information (244) regarding the build. For example, the build information (244) may include information as to the structure of the new artifacts (242) and/or new project version (238), results of testing the new artifacts (242) (e.g., error codes thrown during compilation or testing, files or other data structures accessed by the new artifacts (242) during the testing, quantities of resources used by the new artifacts (242) during testing, etc.). The build information (244) may also include information regarding newly-committed change collections (236) that are included in the new project version (238) that was built to generate the new artifacts (242). Such build information on change collections (236) may alternatively be maintained by the version control server (230) without being maintained by the integration server (240).

If the new artifacts (242) fails (such as failing in the compilation phase or failing one or more of the verification tests run by the integration server (240)), the integration server (240) can inform a diagnosis agent (250) of such failure. The diagnosis agent (250) can receive at least some of the build information (244) from the integration server (240) and/or the version control server (230), and can use such information as symptoms in diagnosing a failure of the new build. The diagnosis agent (250) can also access a model template (252), and can use the model template (252) and the received build information (244) to prepare a model (254). The preparation of the model (254) can be performed by making alterations to an existing model or constructing a new model. For example, the model template (252) may include probabilistic information relating symptoms to defects, as is discussed more below. For each of multiple change collections (236) and for each of one or more target components of the new artifacts (242), the generated model (254) can be analyzed by the diagnosis agent (250) to estimate the likelihood that the change collection (236) introduced into the new project version (238)—and thereby introduced into the new artifacts (242)—a defect that contributed to the build failure. Additionally, the estimated likelihood can be used to generate scores (256) for the change collections (236), which each represent an estimated likelihood of the associated change collection (236) having introduced a defect that contributed to the failure of the new build. Additionally, the diagnosis agent (250) can analyze the scores (256) to produce rank information (258), which can rank the relative likelihood that the different change collections (236) introduced a defect that contributed to a failure of the new build. The diagnosis agent (250) may also send the rank information (258) to one or more developer clients (220 and/or 222) and/or automatically instruct the version control server (230) to roll back a change collection (236) that has a sufficiently high score (256). The version control server (230) can respond to such an instruction by rolling back the change collection (236) by removing its changes from another new project version (238) and instructing the integration server (240) to build and test that new project version (238). Additionally, where multiple change collections (236) modify the same files, the change collection (236) that was identified as a likely culprit can be rolled back along with other more recently committed change collections (236) that touched (relied on, changed, etc.) the same files.

Many variations in the environment (200) may be implemented in different scenarios. For example, one or more of the version control server (230), integration server (240), diagnosis agent (250), and/or the developer clients (220 and 222) could be hosted on a single computing machine, rather than several machines connected by the network (210). For example, while the diagnosis agent (250) is shown on a separate machine in FIG. 2, the diagnosis agent (250) may be hosted on the same machine as the integration server (240), and may be part of the integration server (240). Indeed, the version control server (230), the integration server (240), and the diagnosis agent (250) may all be part of a single application that can be running on a single machine or a distributed set of machines, such as a computer cluster.

Figure 3:
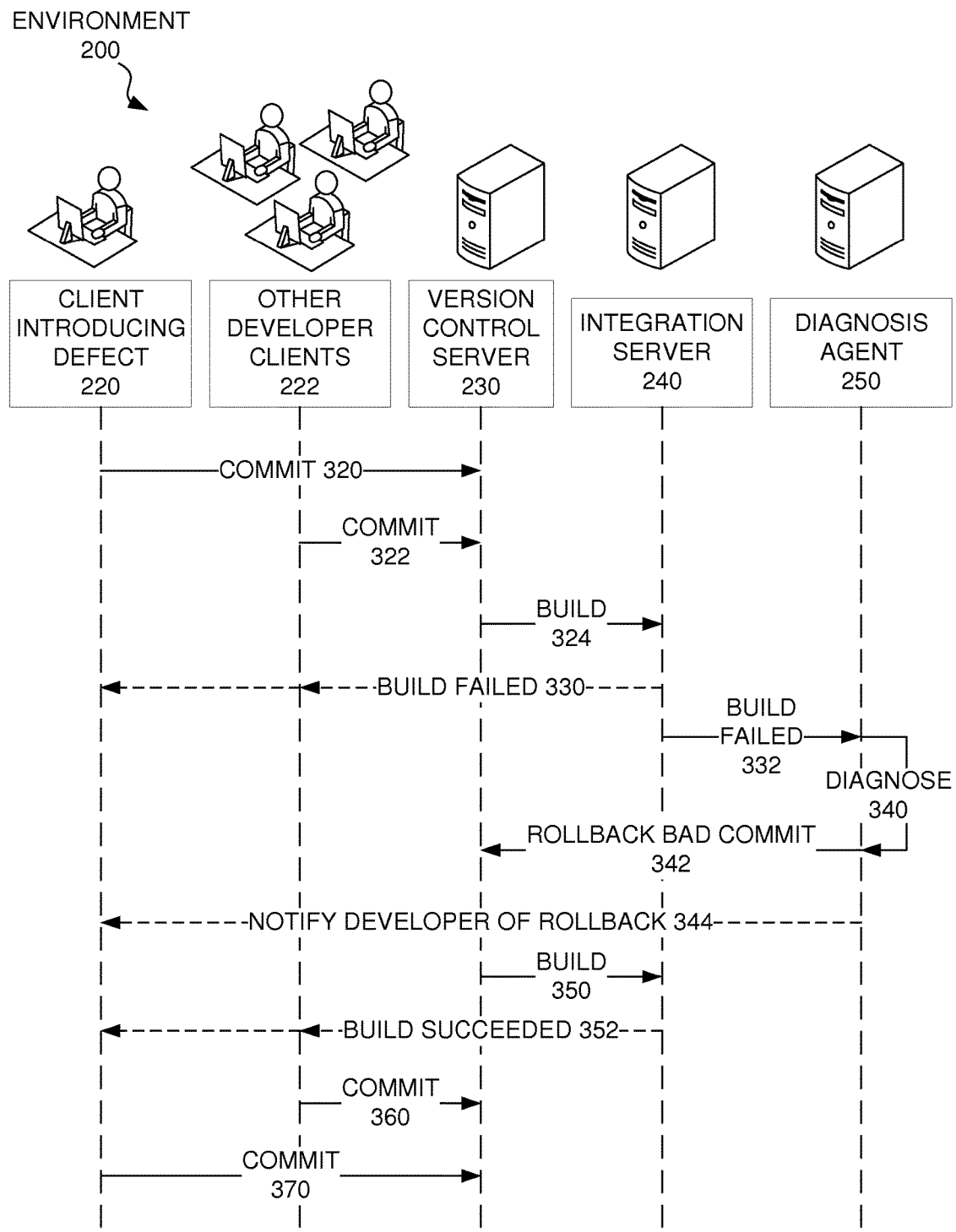
FIG. 3 is a sequential flow diagram illustrating an example of a sequential flow including estimation of likelihood of code changes introducing defects.

III. Operations for Estimating Likelihood of Code Changes Introducing Defects Referring now to a sequential flow diagram in FIG. 3, examples of operations (310) for estimating likelihood of code change collections introducing defects will be discussed with reference to computer components (220, 222, 230, 240, and 250) discussed above with reference to FIG. 2. The operations (310) can include the client introducing the defect (220) sending a change collection with a commit instruction (320) to the version control server (230). The other developer clients (222) can send one or more other change collections with one or more other commit instructions (322), with a commit instruction (322) for each change collection. The version control server (230) can send a build instruction (324) to the integration server, instructing the integration server to build and conduct verification tests on a new build that is to include the new change collections received with the commit instructions (320 and 322). The integration server (240) can determine that the build failed, such as by identifying one or more error messages with one or more error codes or by inspecting an exit code of a computing component invoked in the build process. In response, the integration server (240) can send a failed build notification (330) to the clients (220 and 222). The failed build notification (330) may also be sent to the version control server (230). The clients (220 and 222) may be blocked from committing additional change collections to the version control server (230) until being notified that a subsequent build succeeded. The integration server (240) may also send a failed build notification (332) to the diagnosis agent (250). The failed build notification (332) may also serve as an instruction for the diagnosis agent (250) to diagnose the failure.

As will be discussed more below, the diagnosis agent can diagnose (340) the failure by estimating the likelihood of each of multiple newly-committed change collections (change collections committed since the last successful build) having introduced at least one defect that contributed to the build failure. The diagnosis (340) can yield an identification of a "bad commit," or in other words a newly-committed change collection that is identified as having a sufficiently high estimated likelihood of having introduced a defect that contributed to the failure of the build. The diagnosis agent (250) can send a rollback instruction (342) to the version control server (230), instructing the version control server (230) to roll back the bad commit, or in other words, to undo the changes introduced by the bad commit change collection. Indeed, the diagnosis agent (250) may send multiple rollback instructions (342) to the version control server (230) in response to a single diagnosis (or in response to multiple successive diagnoses, as discussed below), instructing the version control server to roll back multiple bad commits. For example, multiple rollback instructions (342) may be sent if it appears that multiple commits each introduced one or more distinct defects. The diagnosis agent (250) can also send a rollback notification (344) to the client introducing the defect (220), informing that client that its newly-committed change collection has been identified as being a likely source of a defect, and that the newly-committed change collection has been rolled back. The diagnosis agent (250) can also send rollback notifications to the other clients (222) working on the same project.

The rollback notification (344) may also include details of the diagnosis (340), such as identifying the likely defect, and providing additional information (location, etc.) of the likely defect. The version control server (230) can respond to the rollback instruction (342) by rolling back the bad commit, and by sending a new build instruction (350) to the integration server (240), instructing the integration server (240) to perform another build and verification that is the same as the previous build, but this time with the bad commit having been rolled back. The integration server (240) can respond by performing the build and verification operations, and can sending a build success notification (352) to the clients (220 and 222), and possibly to the version control server (230), notifying the components (220, 222, and/or 230) that the build succeeded, and that new change collections can now be committed. One of the other developer clients (222) can the send a commit instruction (360), instructing the version control server (230) to commit a new change collection. Additionally, the client introducing the defect (220) may also fix the bad commit and subsequently send the fixed change collection in a subsequent commit instruction (370). The operations (310) can be repeated as is useful in the development process.

If a build fails after rolling back a change collection, then the diagnosis (340) can be performed again, and another change collection can be selected to be rolled back. With each such iteration, the number of possible bad change collections will decrease and the chances for successfully rolling back the change collection that actually introduced the defect can increase. Additionally, it is possible that multiple change collections each introduced one or more defects, and multiple iterations of diagnosis and rolling back can roll back such bad commits, allowing the development project to be successfully built so that development can continue.

In addition to, or instead of, the diagnosis agent (250) automatically sending the rollback instruction (342) at the conclusion of the diagnosis, the diagnosis agent may rank the newly-committed change collections according to the estimated likelihood that each introduced one or more defects that contributed to the build failure. The diagnosis agent can send one or more of the clients (220 and 222) a ranking, such as a ranked list of the change collections. One or more of the clients (220 and/or 222) may respond to receipt of the ranking by receiving user input, instructing the system as to how to respond to the ranking. For example, a client (220 or 222) may receive user input from a developer, indicating that a highest ranked change collection (or other change collection selected by the user input) is to be rolled back. In response, the client (220 or 222) can send a rollback instruction to the version control server (230), which can respond by rolling back the change collection and instructing the integration server (240) to rebuild the project with that change collection having been rolled back.

IV. Diagnosis Example

Figure 4:
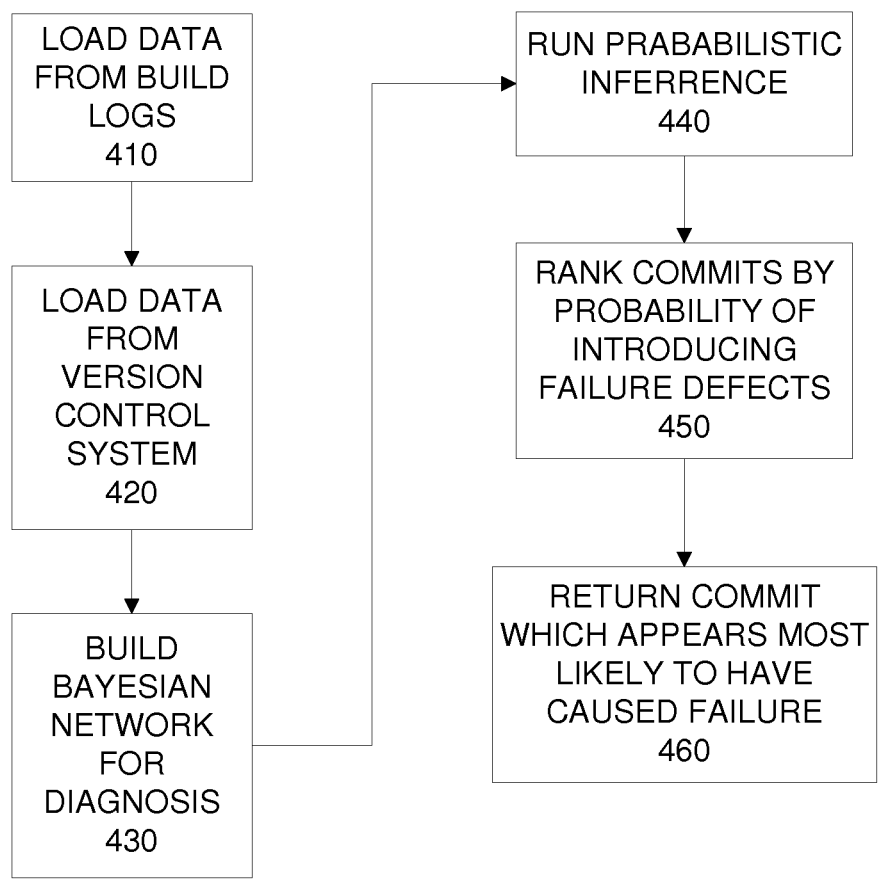
FIG. 4 is a flow diagram of an example of software project build failure diagnosis technique.

Referring now to FIG. 4, an example of a diagnosis technique for the diagnosis (340) discussed above will be discussed. In the diagnosis technique, the diagnosis agent can diagnose the build failure, estimating a likelihood that each of multiple newly-committed change collections introduced one or more defects that contributed to the failure of the build.

The diagnosis technique can include collecting build information. For example, the collection may include loading (410) data from build logs, which are logs produced during the generation and/or verification testing of the new build. The collection may also include loading (420) data from the version control system. In some scenarios, only some data may initially be collected, and the diagnosis may be conducted on the basis of that data. If that diagnosis produces a clear highest-ranking candidate of the newly-committed change collections (e.g., if the score for the highest-ranking candidate is above a predetermined threshold value), then that candidate can be rolled back. However, if this initial diagnosis does not produce a sufficiently clear highest-ranking candidate, then additional information can be collected and the diagnosis can be re-run with the additional collected information.

The collected data can be used along with a Bayesian network template to generate a model to be used in the diagnosis, for example, the diagnosis agent can build (430) a probabilistic model in the form of a Bayesian network for use in the diagnosis. The building (430) of the Bayesian network can start from a Bayesian network template. The template may be a separate data structure, or it may be integrated with other information. For example, the template may be included in software code for the diagnosis agent itself. The template can identify sets of symptoms, and can associate each symptom set with a defect. The template can also provide a probability value. As with other probability values, rank values, likelihoods, etc. discussed herein, the probability values represent estimates. In particular, these probability values each represent an estimate of the probability that a particular change collection introduced a particular defect into a particular code section of the software project, contributing to the failure of the build.

In a particular example, each probability can begin as a pair of values entered by user input, with one value representing the number of times the set of symptoms has been found and a subject change collection related to the symptoms introduced the specified defect into a subject code section of a software project ($V_{U-T}$), and another value representing the number of times the set of symptoms has been found and a subject change collection related to the symptoms did not introduce the specified defect into a subject code section of a software project ($V_{U-F}$). These starting values from user input can be supplemented with corresponding values from historical data, with a value representing the number of times the set of symptoms has been found and that a subject change collection related to the symptoms introduced the specified defect into a subject code section of a software project ($V_{TR-T}$), and another value representing the number of times the set of symptoms has been found and a subject change collection related to the symptoms did not introduce the specified defect into a subject code section of a software project ($V_{TR-F}$). Information on whether such defects were present along with the symptoms can be continually fed into the system to provide online machine learning, with the values $V_{TR-T}$ and $V_{TR-F}$ changing over time. With these values, the estimated probability ($P(D1=1)$) that, where the evidence symptoms (E1 and E2) are found, a subject change collection (C1) related to the evidence symptoms introduced the specified defect (D1) into a subject code component or section (T) of a software project can be expressed as follows:

$$P(D1 = 1 | E1, E2) = \frac{V_{U-T} + V_{TR-T}}{V_{U-F} + V_{TR-F} + V_{U-T} + V_{TR-T}}$$

Conversely, the estimated probability ($P(D1=0)$) that, where the evidence symptoms (E1 and E2) are found, a subject change collection (C1) related to the evidence symptoms did not introduce the specified defect into a subject code target or section (T) of a software project can be expressed as follows:

$$P(D1 = 0 | E1, E2) = \frac{V_{U-F} + V_{TR-F}}{V_{U-F} + V_{TR-F} + V_{U-T} + V_{TR-T}}$$

Of course, the probabilities may be expressed in the network in terms of the estimated probability that the defect is introduced by the subject change collection, or the estimated probability that the defect is not introduced by the subject change collection.

Figure 5:
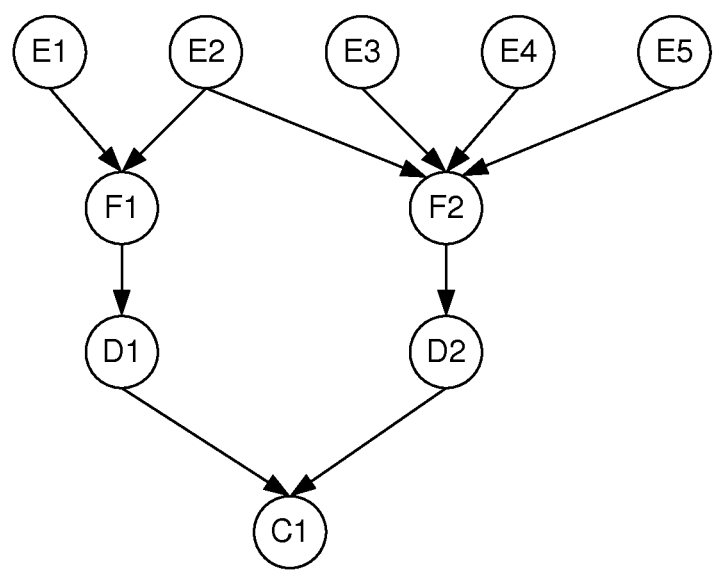
FIG. 5 is a schematic illustration of an example of a portion of a Bayesian network that can be used in producing probability scores for code change collections that are candidates for having introduced defects into a software project.

In building (430) the Bayesian network, the diagnosis agent can determine which sets of symptoms are present for the particular code component, build, and change collection being analyzed. Such symptoms and their associated nodes can be included in the Bayesian network. The diagnosis agent can continue adding new nodes in the Bayesian network for new components, new change collections, and new pairs of defects and symptoms. Referring now to FIG. 5, a schematic illustration of an example of a section of such a Bayesian network is shown. In the network, evidence nodes E1, E2, E3, E4, and E5 each indicate the presence of a corresponding symptom, or piece of evidence. The template can indicate that when a first set of evidence, including E1 and E2, is present, as indicated by the presence of the set node F1, then this indicates a probability that defect D1 was introduced by the corresponding change collection. Likewise, the template can indicate that when a second set of evidence, including E2, E3, E4, and E5, is present, as indicated by the presence of the set node F2, then this indicates a probability that defect D2 is introduced by the corresponding change collection. Where D1 and D2 are the only identified potential defects introduced by a change collection C1, the combined probabilities that D1 and D2 are introduced by the corresponding change collection C1 provides the estimated probability that C1 introduced a defect into the code.

Referring back to FIG. 4, the technique can include running (440) probabilistic inference using the Bayesian network. In one example, assuming that the defects are independent events, the probabilities for multiple defects can be combined to provide an estimate of a probability that a particular change collection introduced one or more defects that contributed to the failure by multiplying together the probabilities that each of the defects is not present, and subtracting that product from 1. For example, for two defects, the probability that the first defect is not present is given by $P(D1=0)$, and the probability that the second defect is not present is given by $P(D2=0)$. In this instance, the estimated probability that the change collection introduced a defect ($P(C1=1)$) can be expressed in the following equation:

$$P(C1=1|D1,D2)=1-P(D1=0)*P(D2=0)$$

Such probabilities can be calculated for each newly-committed change collection for each identified code section of the software project or build. The different probabilities for different code sections can be treated separately, or they could be combined, such as in a manner similar to combining the probability estimates for different defects, as discussed above.

Referring still to FIG. 4, the technique can include ranking (450) the commits (newly-committed change collections) by their estimated probability of introducing failure defects. This can include ranking the newly-committed change collections by their calculated probability estimate values or probability scores. Also, the probability scores for the change collections can be scaled. For example, the probability scores may be scaled so that they all add up to a sum of a predetermined value such as one (i.e., for probabilities for N change collections, $1=P(C1=1)+P(C2=1) \ldots +P(CN=1)$).

Additionally, the system can return (460) the change collection that appears most likely to have introduced one or more defects causing the build failure. This can include returning an identification of a highest-ranked change collection, so that the identified change collection can be rolled back, and/or returning a more complete ranking, such as a ranked list of multiple change collections, ranked in order of their probability scores. Where there are multiple code sections being analyzed separately, the returning (460) may include returning multiple ranked lists, with one for each code section being separately analyzed.

In one aspect, the returning (460) may be done differently depending on whether one or more change collection scores exceeds a threshold value. For example, for each change collection whose score exceeds a threshold, that change collection can be automatically rolled back and the project can be automatically rebuilt with those change collection(s) having been rolled back. However, if no score exceeds the threshold, then a ranked list can be returned, allowing user input to be provided to select one or more change collections to roll back. For example, where the probability scores are scaled to add up to a value of one, the threshold may be a value that is selected by user input depending on a developing team's tolerance for false positives (having change sets automatically rolled back even if the change sets did not introduce a defect). For example, where the scores are scaled to add up to a value of one, a threshold value between zero and one may be selected. A threshold value of 0.5 (one-half) or higher can be selected to guarantee that no more than one change collection will be automatically rolled back in a single iteration. Likewise, a threshold value of 0.33 (one-third) or higher can be selected to guarantee that no more than two change collections will be automatically rolled back in a single iteration. Also, a threshold value of 0.25 (one-fourth) or higher can be selected to guarantee that no more than three change collections will be automatically rolled back in a single iteration.

The features discussed herein can produce benefits that can result in the development computer system being more efficient and user-friendly for use by developers. It can do this by automatically identifying change collections that are likely to have introduced defects, and in some aspects automatically rolling back such identified change collections. This can allow the computer system to more quickly deal with build failures and allow normal computer software project development to continue.

V. Techniques for Estimating Likelihood of Code Changes Introducing Defects

Several techniques for estimating likelihood of code changes introducing defects will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic.

Figure 6:
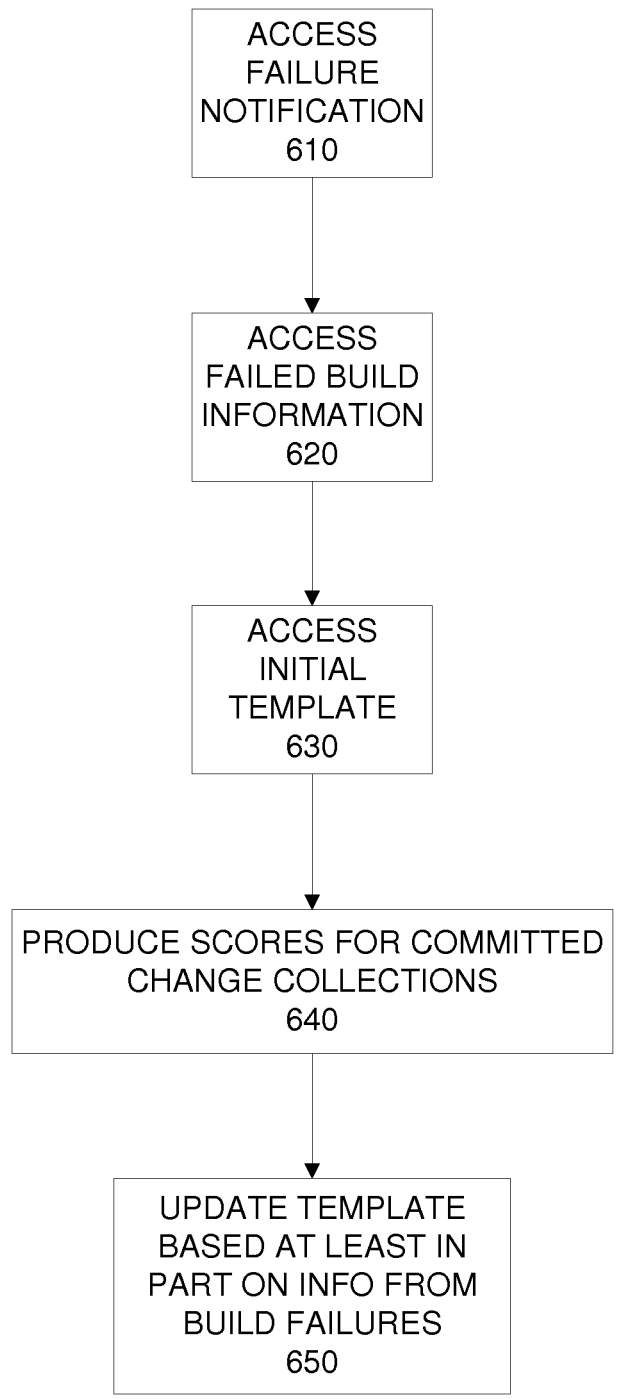
FIG. 6 is a flow diagram of a technique for estimating likelihood of code changes introducing defects.

Referring to FIG. 6, a technique for estimating likelihood of code changes introducing defects will be described. The technique can include accessing (610) a failure notification that a failed build of a computer software project under development has failed. For example, a diagnosis agent may access a stored indication of such a failure, or receive a message (network message, function call, application programming interface call, etc.) indicating such a failure. Additionally, the technique can include accessing (620) failed build information. The failed build information can indicate that the software project for the failed build included a plurality of committed code change collections each comprising one or more changes to the project that were identified in a commit instruction, with the plurality of committed change collections having been committed since a previous successful build of the computer software project. For example, such information may be provided by a version control server in response to a request for such information. The information can further describe symptoms of the failed build. For example, the information on symptoms may be obtained one or more of various ways, such as by accessing information provided by a version control server, by parsing build logs, and/or by accessing results of analysis by one or more tools, such as one or more compilers, translators, etc.

The technique of FIG. 6 can further include accessing (630) an initial computer-readable template. For example, as discussed above the template can include a data structure with information on the likelihood of respective committed change collections being at least a partial cause of one or more defects in a build that contributed to a build failure.

The technique can also include producing (640), via a computer component, respective scores for the committed change collections, with each score representing an estimate of a likelihood that an associated committed change collection is at least a partial cause of one or more defects in the build that contributed to the build failure. The producing (640) of the scores can be based at least in part on the initial template and on the information about the failed build. For example, as discussed in more detail above, producing (640) the scores can include constructing a model from a template by cloning one or more template nodes that are applicable to the current build failure, based on sets of symptoms from the template being matched with observed symptoms of the current build failure. Such symptoms may be observed by parsing through and analyzing data structures such as the types of data structures discussed above (build logs, version control server responses, data structures produced by compilers and/or translators, etc.). Producing (640) the scores can also include using the model to produce, via a computer component such as the diagnosis agent discussed above, respective scores for the committed change collections. Each score can represent an estimation of a likelihood that an associated committed change collection is at least a partial cause of one or more defects in the build that contributed to the build failure. This use of the model to produce the scores can include combining scores from a set of one or more potential defects that are identified for each of multiple committed change collections. For example, the scores for a change collection and a target code section can be combined according to formulas, such as those discussed above. In one example, the model can be a probabilistic model, such as a model that includes a Bayesian network.

The technique of FIG. 6 can further include updating (650) the template, based at least in part on information from a plurality of build failures, as part of a machine learning feedback loop to produce an updated template. For example, the updating of the template may change the initial template so that the updated template reflects the presence and/or absence of defects in the presence of corresponding sets of symptoms in the plurality of build failures, where the defects are correlated with the corresponding symptom sets in the initial template and in the updated template. Also, the template can include a plurality of probability estimates that each represents an estimate of a probability of a corresponding defect being introduced by a committed code change collection in the presence of a specified set of symptoms, where updating the template includes updating one or more of the probability estimates.

In one aspect, the failed build can be termed a first failed build, the failure notification can be termed a first failure notification, the information can be termed a first set of information, the plurality of committed code change collections can be termed a first set of committed code change collections, the previous successful build can be termed a first previous successful build, and the scores can be termed a first set of scores. In this aspect, the technique can include the following: accessing a second failure notification that a second failed build of the computer software project under development has failed; accessing a second set of information about the second failed build, the second set of information indicating that the software project for the second failed build included a second set of a plurality of committed code change collections each comprising one or more changes to the project that were identified in a commit instruction, the plurality of committed change collections having been committed since a second previous successful build of the computer software project, and the information further describing symptoms of the second failed build; accessing the updated template; and producing, via a computer component, a second set of respective scores for the second set of committed change collections, each score of the second set of scores representing an estimate of a likelihood that an associated committed change collection is at least a partial cause of one or more defects in the build that contributed to the second build failure, the producing of the second set of scores being based at least in part on the updated template and on the information about the second failed build.

Additionally, the technique can include ranking the committed change collections relative to each other according to the committed change collections' respective scores. For example, the ranking may include ordering the committed change collections from highest to lowest score in a list of the committed change collections, or in some other data structure. As another example, the ranking may include storing the scores for the committed change collections along with identifiers that link each ranking score with the corresponding committed change collection. Such scores may be accessed and compared to each other to determine a highest score, and possibly a next-highest score, etc.

As discussed in previous sections, the model that is used to rank the collections may be any of various different types of models. In one aspect, the model is a probabilistic model, which provides probability estimate scores. For example, the model may include a Bayesian network.

The failed software project build can occur within a system of computer software development, such as a continuous integration system of computer software development. Also, the technique may include returning a ranked list that ranks the committed change collections relative to each other according to the committed change collections' respective scores. For example, this returning may include sending the ranked list over a computer network, storing the ranked list and sending a link to the ranked list in a network message, function call, application programming interface call, or sending the ranked list in some other manner. Additionally, the technique may include scaling the scores, such as scaling the scores so that all the scores for the failed build add up to a predetermined value, such as a value of one.

The technique of FIG. 6 may further include using the scores to identify a top candidate of the committed change collections for rolling back in a subsequent attempt to rebuild the software project under development. For example, the top candidate can be the candidate with the highest score, and such highest score can be determined by comparing multiple scores, by selecting the candidate at the top of a ranked list that is in order of the values of the scores, etc. The technique can include providing an instruction to rebuild the software project under development with changes by the identified top candidate being rolled back. For example, this can include providing an instruction to a version control server to roll back the top candidate, and providing an instruction to an integration server to rebuild the project under development. For example, the instructions may be sent in the form of network messages, application programming interface calls, function calls, etc.

The technique can further include determining that a score for the top candidate exceeds a threshold value. In this instance, providing the instruction to rebuild the software project under development with changes by the identified top candidate being rolled back can be performed in response to the determination that the score for the top candidate exceeds the threshold value.

The preparation (630) of the computer-readable model can be based at least in part on a template, and the technique may further include updating the template based at least in part on information from the build failure. For example, if a top candidate is rolled back due to an identified defect potentially introduced by that top candidate, and if it is late confirmed (such as through user input provided by a developer) that the defect was indeed introduced by that top candidate, then the probability numbers (e.g., the historical data numbers discussed above) can be updated to reflect the inclusion of this instance of the corresponding symptoms. Accordingly, a feedback loop can produce online machine learning to refine the template that can be used to prepare future models to produce scores for committed change collections for future build failures.

Figure 7:
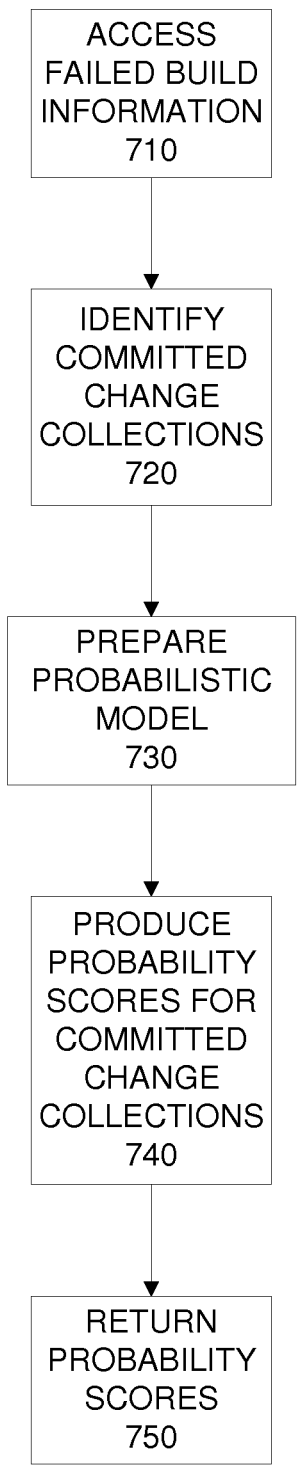
FIG. 7 is a flow diagram of another technique for estimating likelihood of code changes introducing defects.

Referring now to FIG. 7, yet another technique for estimating likelihood of code changes introducing defects will be discussed. The technique can include accessing (710) information about a failed build of a computer software project under development, with the information describing symptoms of the failed build. A plurality of committed change collections can be identified (720) as collections that were committed since a previous successful build of the computer software project. For example, this identification of the committed change collections can include retrieving from a version control server information identifying the change collections, where each such change collection was committed as a batch since a last successful build of the software project. The version control server can obtain such information from its standard data structures used to track versions of the computer software project.

The technique of FIG. 7 can further include preparing (730) a computer-readable probabilistic model based at least in part on the build failure information. Further, the technique of FIG. 7 can include producing (740), based at least in part on the probabilistic model, respective probability scores for the committed change collections. Each probability score can represent an estimate of a probability that an associated one of the committed change collections is at least a partial cause of the build failure. For example, the probability score may be based on probability scores representing the likelihood of the change collection introducing defect(s) contributing to the build failure, as discussed above. Additionally, the probability scores can be returned (750), such as returning the probability scores to a computer component to do further analysis (e.g., returning the scores in one or more calls to a component that compares scores to a threshold, ranks the scores relative to each other, provides instructions to roll back one or more of the change collections, etc.), and/or returning the probability scores in a list of the committed change collections (e.g., returning such a list to one or more clients, where the lists can be displayed for viewing by developer(s)).

In one aspect, returning (750) the probability scores can include returning the probability scores to a computing component in the computer system, the computing component being programmed to rank the committed change collections based at least in part on the probability scores. Also, the technique may further include determining that a probability score for an identified committed change collection exceeds a threshold value. For example, such a threshold value may be stored (such as being stored in response to user input), and the identified change collection (for example, a change collection with a highest score) can be compared to that stored threshold value. In response to determining that the probability score for the identified committed change collection exceeds the threshold value, the technique may include automatically rolling back the identified change collection from the software project under development and attempting to rebuild the software project under development with the identified change collection rolled back. For example, this may include invoking a version control server to roll back the change collection (e.g., modifying the software project to reverse one or more changes from the change collection and/or bringing up and using earlier saved version(s) of the software project prior to the change collection having been committed), and invoking an integration server to rebuild the software project with the change collection having been rolled back by the version control server.

In one aspect of the FIG. 7 technique, it may be determined that a probability score for an identified committed change collection (e.g., a highest ranking change collection) does not exceed a threshold value. In response to this determination, a system may forego automatically rolling back the identified committed change collection, and may automatically forego automatically rolling back any of the committed change collections. The system may respond to the determination that the probability score for the identified committed change collection does not exceed the threshold value by returning a list of the committed change collections, with the list ranking the committed change collections according to the respective probability scores.

Figure 8:
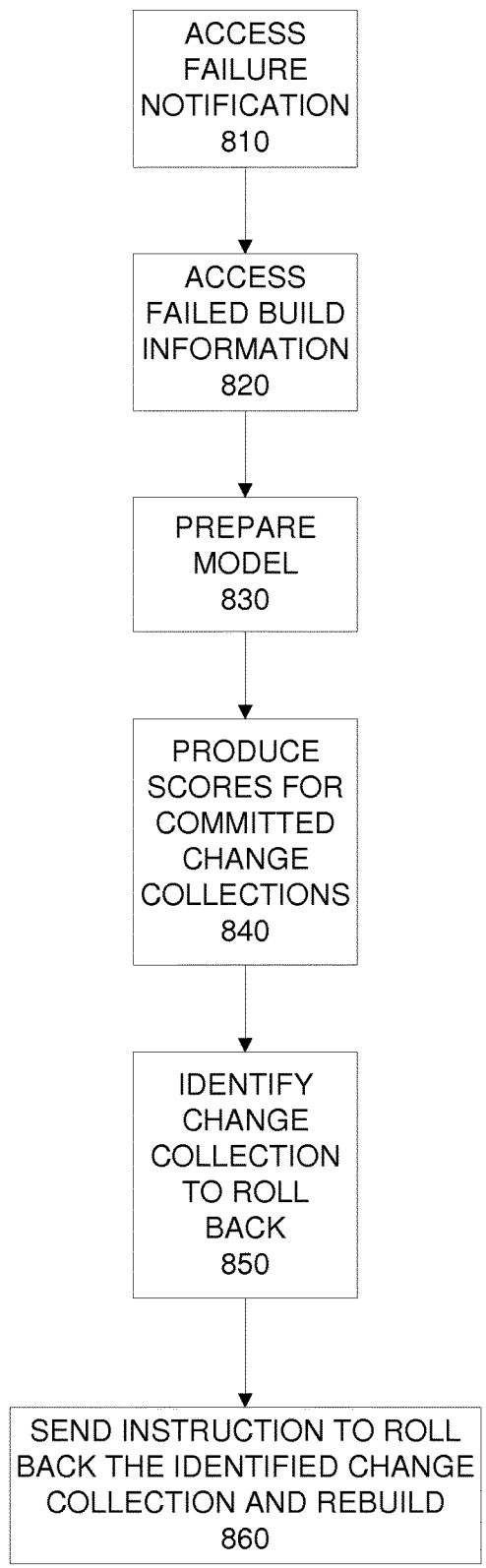
FIG. 8 is a flow diagram of yet another technique for estimating likelihood of code changes introducing defects.

Referring now to FIG. 8 yet another technique for estimating likelihood of code changes introducing defects will be discussed. The technique can include accessing (810) a failure notification that a failed build of a computer software project under development has failed one or more tests (e.g., validation tests such existing validation tests performed on new builds). Information about the failed build can be accessed (820), as discussed above. The information can indicate that the software project for the failed build included a plurality of committed change collections each comprising one or more changes to the project. The change collection(s) can be collection(s) that have been committed since a previous successful build of the computer software project. The information can further describe symptoms of the failed build (e.g., error codes from build logs, other information from build logs, etc.). The technique of FIG. 8 can further include preparing (830) a computer-readable model based at least in part on the information. The technique can also include producing (840), based at least in part on the model, respective scores for the committed change collections. Each score can represent an estimate of a likelihood that an associated committed change collection is at least a partial cause of one or more defects in the build. The technique can further include identifying (850), based on one or more of the scores, a change collection from the software project under development to roll back. In response to identifying (850) the change collection to roll back, the technique can include sending (860) one or more computer-readable instructions to roll back the identified change collection and to rebuild the software project under development with the identified change collection rolled back.

The technique of FIG. 8 can further include determining that a score for the identified change collection exceeds a threshold value, and where identifying the identified change collection as a change collection to roll back can be performed in response to determining that a score for the identified change collection exceeds the threshold value. Additionally, the technique can further include accessing a second failure notification that a second failed build of the computer software project under development has failed. The technique can further include accessing a second set of information about the second failed build, the second set of information can indicate that the software project for the second failed build included a second set of a plurality of committed change collections each comprising one or more changes to the second failed build, with the plurality of committed change collections having been committed since a previous successful build of the computer software project subsequent to the first failed build and prior to the second failed build. The second set of information can further describe a second set of symptoms of the second failed build.

The technique can include preparing a computer-readable model based at least in part on the information, as well as producing, based at least in part on the model, respective scores for the committed change collections. Each score can represent an estimation of a likelihood that an associated committed change collection is at least a partial cause of one or more defects in the build. A change collection to roll back from the software project under development can be identified, based at least in part on one or more of the scores. In response to identifying the change collection to roll back, one or more computer-readable instructions to roll back the identified change collection and to rebuild the software project under development with the identified change collection rolled back can be sent (e.g., sent to an integration server and/or a version control server).

Additionally, as with the other models discussed above, the model can be a probabilistic network data structure, such as a Bayesian network.

VI. Aspects of Certain Embodiments

Aspects of certain embodiments will now be discussed. In a first aspect, a computer-implemented method can include accessing a failure notification that a failed build of a computer software project under development has failed. The method can further include accessing information about the failed build, with the information indicating that the software project for the failed build included a plurality of committed code change collections each including one or more changes to the project that were identified in a commit instruction, with the plurality of committed change collections having been committed since a previous successful build of the computer software project, and the information further describing symptoms of the failed build. The method of the first aspect can further include accessing an initial computer-readable template, as well as producing, via a computer component, respective scores for the committed change collections, each score representing an estimate of a likelihood that an associated committed change collection is at least a partial cause of one or more defects in the build that contributed to the build failure. The producing of the scores can be based at least in part on the initial template and on the information about the failed build. The method of the first aspect can further include updating the template, based at least in part on information from a plurality of build failures, as part of a machine learning feedback loop to produce an updated template.

The features of the first aspect discussed in the preceding paragraph may be combined with combinations of one or more of the following further features:

The first aspect can further include ranking the committed change collections relative to each other according to the committed change collections' respective scores.

The template can include a plurality of probability estimates that each represents an estimate of a probability of a corresponding defect being introduced by a committed code change collection in the presence of a specified set of symptoms, and wherein updating the template includes updating one or more of the probability estimates.

The first aspect can further include accessing a second failure notification that a second failed build of the computer software project under development has failed; accessing a second set of information about the second failed build, the second set of information indicating that the software project for the second failed build included a second set of a plurality of committed code change collections each comprising one or more changes to the project that were identified in a commit instruction, the plurality of committed change collections having been committed since a second previous successful build of the computer software project, and the information further describing symptoms of the second failed build; accessing the updated template; and producing, via a computer component, a second set of respective scores for the second set of committed change collections, each score of the second set of scores representing an estimate of a likelihood that an associated committed change collection is at least a partial cause of one or more defects in the build that contributed to the second build failure, the producing of the second set of scores being based at least in part on the updated template and on the information about the second failed build.

The producing of the scores can include producing a model based at least in part on the template and on the information about the failed build.

The model may be a probabilistic model.

The probabilistic model may include a Bayesian network.

The build of the software project can occur within a continuous integration system of computer software development.

A ranked list that ranks the committed change collections relative to each other according to the committed change collections' respective scores can be returned.

The scores can be scaled.

The scores can be used to automatically identify a top candidate with a top score (which indicates the candidate is estimated to be most likely to have introduced defect(s) that contributed to the failure, though the top score could be a highest score, lowest score, etc., depending on the specific technique used) of the committed change collections for rolling back in a subsequent attempt to rebuild the software project under development.

Instruction(s) to rebuild the software project under development with changes by the identified top candidate being rolled back can be automatically provided.

The method of the first aspect can further include determining that a score for the top candidate exceeds a threshold value, where providing one or more instructions to rebuild the software project under development with changes by the identified top candidate being rolled back can be performed in response to the determination that the score for the top candidate exceeds the threshold value.

The preparation of the computer-readable model can be based at least in part on a template.

The method of the first aspect can further include updating the template based at least in part on information from the build failure.

In a second aspect, a computer system can include means for accessing information about a failed build of a computer software project under development, with the information describing symptoms of the failed build. The computer system can also include means for preparing a computer-readable probabilistic model based at least in part on the information. Further, the computer system of the second aspect can include means for producing, based at least in part on the probabilistic model, respective probability scores for the committed change collections, with each probability score representing an estimation of a probability that an associated one of the committed change collections is at least a partial cause of the build failure. Further the computer system can include means for returning the probability scores.

In a third aspect, one or more computer-readable memory can have computer-executable instructions embodied thereon that, when executed by at least one processor, cause at least one processor to perform acts. The acts can include accessing a failure notification that a failed build of a computer software project under development has failed one or more tests. The acts can further include accessing information about the failed build, with the information indicating that the software project for the failed build included a plurality of committed change collections each comprising one or more changes to the project, with the plurality of committed change collections having been committed since a previous successful build of the computer software project, and with the information further describing symptoms of the failed build. The acts of the third aspect can further include preparing a computer-readable model based at least in part on the information, as well as producing, based at least in part on the model, respective scores for the committed change collections. Each score can represent an estimate of a likelihood that an associated committed change collection is at least a partial cause of one or more defects in the build. Also, the acts of the third aspect can include identifying, based at least in part on one or more of the scores, a change collection to roll back from the software project under development, and in response to identifying the change collection to roll back, sending one or more computer-readable instructions to roll back the identified change collection and to rebuild the software project under development with the identified change collection rolled back.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
    accessing a failure notification that a failed build of a computer software project under development has failed;
    accessing information about the failed build, the information indicating that the software project for the failed build included a plurality of committed code change collections each comprising one or more changes to the project that were identified in a commit instruction, the plurality of committed change collections having been committed since a previous successful build of the computer software project, and the information further describing symptoms of the failed build;
    accessing an initial computer-readable template;
    producing, via a computer component, respective scores for the committed change collections, each score representing an estimate of a likelihood that an associated committed change collection is at least a partial cause of one or more defects in the build that contributed to the build failure, the producing of the scores being based at least in part on the initial template and on the information about the failed build;
    using the scores to identify a top candidate with a top score of the committed change collections for rolling back in a subsequent attempt to rebuild the software project under development; and
    providing one or more instructions to rebuild the software project under development with changes by the identified top candidate being rolled back.

2. The method of claim 1, wherein the template includes a plurality of probability estimates that each represents an estimate of a probability of a corresponding defect being introduced by a committed code change collection in a build failure with a specified set of symptoms.

3. The method of claim 1, wherein the producing of the scores comprises producing a probabilistic model based at least in part on the template and on the information about the failed build.

4. The method of claim 3, wherein the model comprises a Bayesian network.

5. The method of claim 1, wherein the build of the software project occurs within a continuous integration system of computer software development.

6. The method of claim 1, further comprising returning a ranked list that ranks the committed change collections relative to each other according to the committed change collections' respective scores.

7. The method of claim 1, further comprising scaling the scores.

8. The method of claim 1, further comprising determining that a score for the top candidate exceeds a threshold value, wherein providing one or more instructions to rebuild the software project under development with changes by the identified top candidate being rolled back is performed in response to the determination that the score for the top candidate exceeds the threshold value.

9. The method of claim 1, wherein the method is performed at least in part by hardware logic.

10. The method of claim 1, further comprising updating the template, based at least in part on information from a plurality of build failures, as part of a machine learning feedback loop to produce an updated template.

11. The method of claim 10, wherein the failed build is a first failed build, the failure notification is a first failure notification, the information is a first set of information, the plurality of committed code change collections is a first set of committed code change collections, the previous successful build is a first previous successful build, the scores are a first set of scores, and wherein the method further comprises:
    accessing a second failure notification that a second failed build of the computer software project under development has failed;
    accessing a second set of information about the second failed build, the second set of information indicating that the software project for the second failed build included a second set of committed code change collections each comprising one or more changes to the project that were identified in a commit instruction, the second set of committed change collections having been committed since a second previous successful build of the computer software project, and the information further describing symptoms of the second failed build;
    accessing the updated template; and
    producing, via a computer component, a second set of respective scores for the second set of committed change collections, each score of the second set of scores representing an estimate of a likelihood that an associated committed change collection is at least a partial cause of one or more defects in the build that contributed to the second build failure, the producing of the second set of scores being based at least in part on the updated template and on the information about the second failed build.

12. The method of claim 10, wherein the template includes a plurality of probability estimates that each represents an estimate of a probability of a corresponding defect being introduced by a committed code change collection in a build failure with a specified set of symptoms, and wherein updating the template includes updating one or more of the probability estimates.

13. A computer system comprising:
    at least one processor; and
    memory comprising instructions stored thereon that when executed by at least one processor cause at least one processor to perform acts comprising:

accessing information about a failed build of a computer software project under development, the information describing symptoms of failure of the failed build;

identifying a plurality of committed change collections as collections that were committed since a previous successful build of the computer software project;

preparing a computer-readable probabilistic model based at least in part on the information;

producing, based at least in part on the probabilistic model, respective probability scores for the committed change collections, each probability score representing an estimate of a probability that an associated one of the committed change collections is at least a partial cause of the build failure;

returning the probability scores;

determining that a probability score for an identified committed change collection exceeds a threshold value; and in response to determining that the probability score for the identified committed change collection exceeds the threshold value, rolling back the identified change collection from the software project under development and attempting to rebuild the software project under development with the identified change collection rolled back.

14. The computer system of claim 13, wherein returning the probability scores comprises returning the probability scores to a computing component in the computer system, the computing component being programmed to rank the committed change collections based at least in part on the probability scores.

15. The computer system of claim 14, wherein the acts further comprise returning a list of the committed change collections, the list ranking the committed change collections according to the respective probability scores.

16. The computer system of claim 14, wherein the acts further comprise ranking the committed change collections via the computing component, based at least in part on the probability scores.

17. One or more computer-readable memory having computer-executable instructions embodied thereon that, when executed by at least one processor, cause at least one processor to perform acts comprising:

accessing a failure notification that a build of a computer software project under development has failed;

accessing information about the failed build, the information indicating that the software project for the failed build included a plurality of committed change collections each comprising one or more changes to the project, the plurality of committed change collections having been committed since a previous successful build of the computer software project, the information further describing symptoms of the failed build;

preparing a computer-readable model based at least in part on the information;

producing, based at least in part on the model, respective scores for the committed change collections, each score representing an estimate of a likelihood that an associated committed change collection is at least a partial cause of one or more defects in the build that contributed to the failure of the build;

determining that a score for an identified change collection exceeds a threshold value;

in response to determining that a score for the identified change collection exceeds the threshold value, identifying the identified change collection as a change collection to roll back from the software project under development; and in response to identifying the change collection to roll back, sending one or more computer-readable instructions to roll back the identified change collection and to rebuild the software project under development with the identified change collection rolled back.

18. The one or more computer-readable memory of claim 17, wherein the failure notification is a first failure notification, the failed build is a first failed build, the information is a first set of information, the plurality of committed change collections is a first set of a plurality of committed change collections, the previous successful build is a first previous successful build, the symptoms are a first set of symptoms, the model is a first model, the scores are a first set of scores, the identified change collection is a first identified committed change collection, and the acts further comprise:

accessing a second failure notification that a second failed build of the computer software project under development has failed;

accessing a second set of information about the second failed build, the second set of information indicating that the software project for the second failed build included a second set of committed change collections each comprising one or more changes to the second failed build, the second set of committed change collections having been committed since a second previous successful build of the computer software project subsequent to the first failed build and prior to the second failed build, the second set of information further describing a second set of symptoms of the second failed build;

preparing a second computer-readable model based at least in part on the second set of information;

producing, based at least in part on the second model, a second set of respective scores for the second set of committed change collections, each score of the second set of scores representing an estimate of a likelihood that an associated committed change collection is at least a partial cause of the second build failure; and ranking the second set of committed change collections relative to each other according to the respective scores of the change collections in the second set of committed change collections;

determining none of the scores in the second set of scores exceeds the threshold value; and in response to determining that none of the scores in the second set of scores exceeds the threshold value, returning a list of the second set of committed change collections, the list ranking the second set of committed change collections according to the respective scores in the second set of scores.

19. The one or more computer-readable memory of claim 17, wherein the model comprises a probabilistic network data structure.

* * * * *